(12) United States Patent
Monopoli et al.

(10) Patent No.: US 8,196,717 B2
(45) Date of Patent: Jun. 12, 2012

(54) DRUM BRAKES

(75) Inventors: Marco Monopoli, Savona (IT); Ivan Cecchelli, Savona (IT); Giovanni Fra, Vercelli (IT)

(73) Assignee: Automotive Products Italia (SV) S.R.L. (IT)

( * ) Notice: Subject to any disclaimer, the term of this patent is extended or adjusted under 35 U.S.C. 154(b) by 0 days.

(21) Appl. No.: 12/227,817

(22) PCT Filed: May 17, 2007

(86) PCT No.: PCT/IB2007/001826
§ 371 (c)(1),
(2), (4) Date: Nov. 29, 2008

(87) PCT Pub. No.: WO2008/139244
PCT Pub. Date: Nov. 20, 2008

(65) Prior Publication Data
US 2010/0101905 A1 Apr. 29, 2010

(30) Foreign Application Priority Data

Jun. 1, 2006 (GB) .................................. 0610780.9
Feb. 9, 2007 (GB) .................................. 0702538.0

(51) Int. Cl.
*F16D 65/54* (2006.01)
(52) U.S. Cl. .................. 188/79.51; 188/79.54; 188/329
(58) Field of Classification Search .................... 188/74, 188/78, 325–342, 79.51, 79.54
See application file for complete search history.

(56) References Cited

U.S. PATENT DOCUMENTS

| 5,042,623 | A | * | 8/1991 | Yamamoto | 188/79.51 |
| 6,125,976 | A | * | 10/2000 | Asai et al. | 188/328 |
| 6,302,245 | B1 | * | 10/2001 | Ikeda | 188/79.51 |
| 2003/0226729 | A1 | * | 12/2003 | Ohnishi et al. | 188/342 |
| 2005/0061595 | A1 | * | 3/2005 | Maehara | 188/325 |

* cited by examiner

*Primary Examiner* — Christopher Schwartz
(74) *Attorney, Agent, or Firm* — RatnerPrestia

(57) ABSTRACT

A drum brake has a pair of brake shoes (40) moveable radially outwardly into contact with an associated brake drum to provide a handbrake function by a cross strut (100) which acts between the brake shoes or between pivoting brake operating levers (14) which actuate the brake shoes. A handbrake lever (18) is pivoted on one brake shoe or brake operating lever (14) and contacts one end of the strut to displace the other brake shoe or brake operating lever towards the drum to apply the associated shoe against the drum and by reaction through the strut to also force the other brake shoe or brake operating lever toward the drum to apply the other shoe against the drum. The strut (100) is in two parts (101,102), one part being connected for movement with each respective brake shoe or operating lever, the strut parts having inter-engageable formations in the form of teeth (103,104) which when engaged allow the strut (100) to transmit axial force between the shoes or operating levers. Bias means (105,106) are provided for biasing the strut parts apart to disengage the inter-engageable formations to disable the strut, the inter-engageable formations (103, 104) being engaged when the handbrake lever (18) is operated to connect the strut parts (101,102) to allow the brake to be applied and being disengaged when the handbrake lever is released so that the strut parts can disengage and move apart with the brake shoes or brake operating levers to adjust the effective length of the strut as the brake shoes wear.

25 Claims, 19 Drawing Sheets

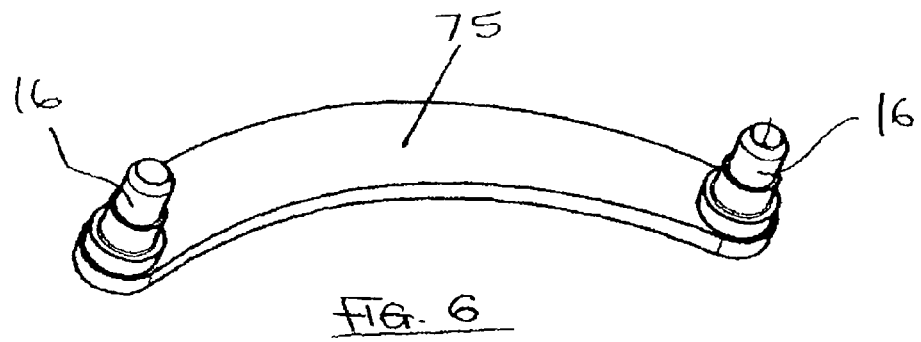
FIG. 6
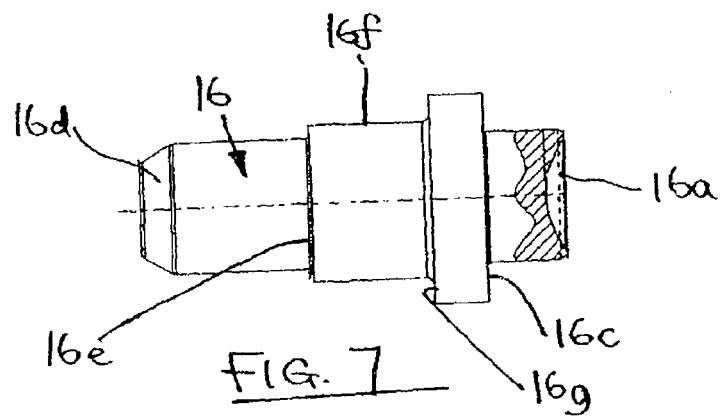
FIG. 7
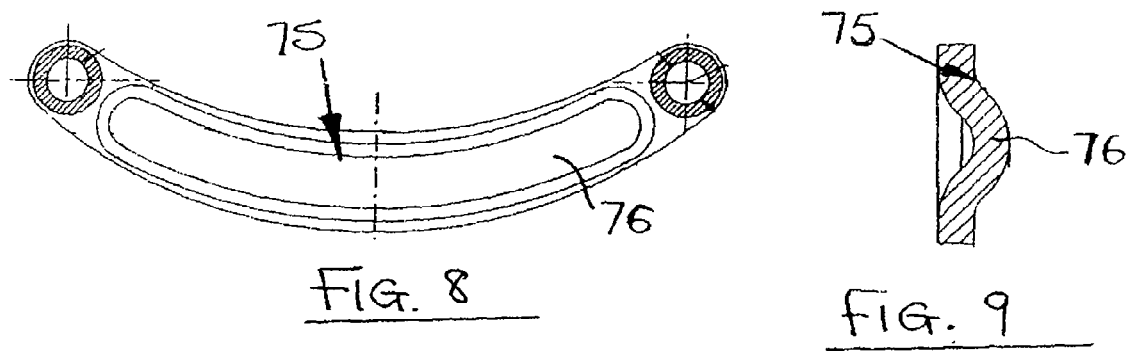
FIG. 8
FIG. 9
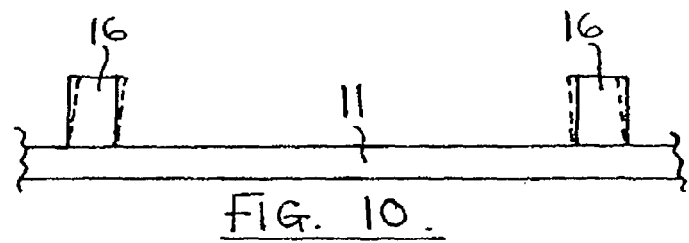
FIG. 10

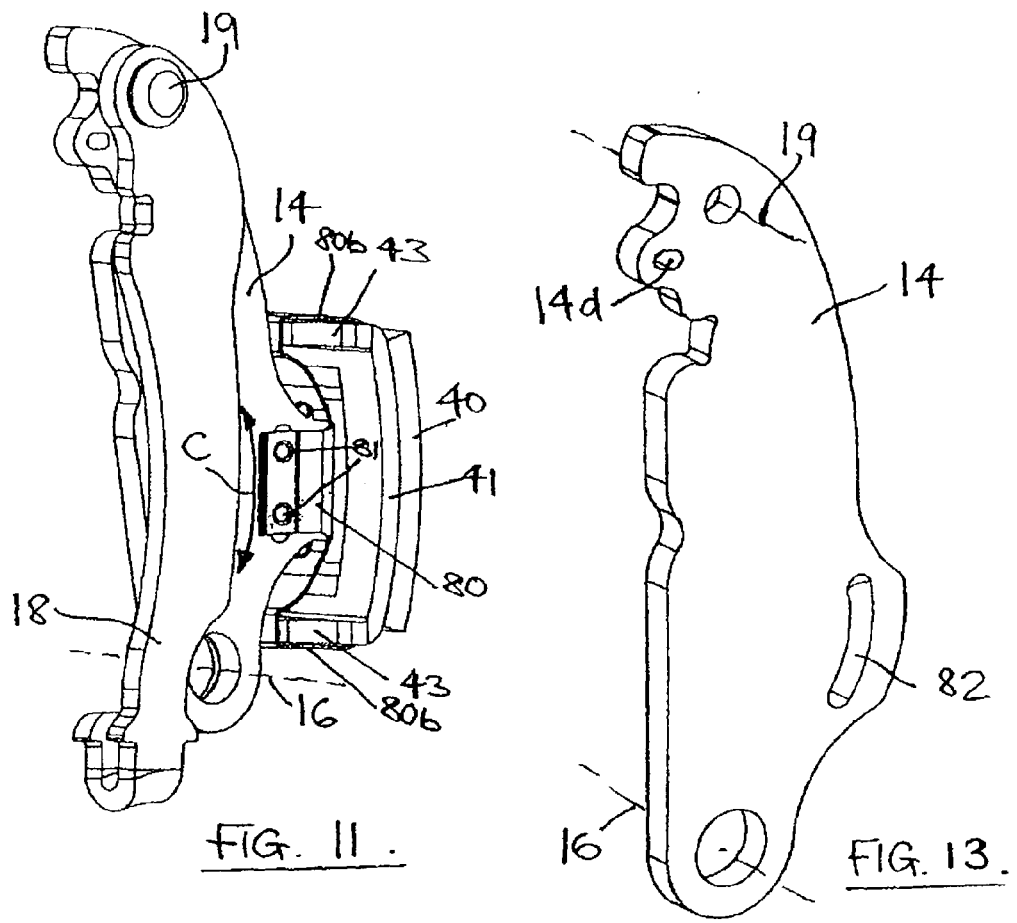
FIG. 11.
FIG. 13.
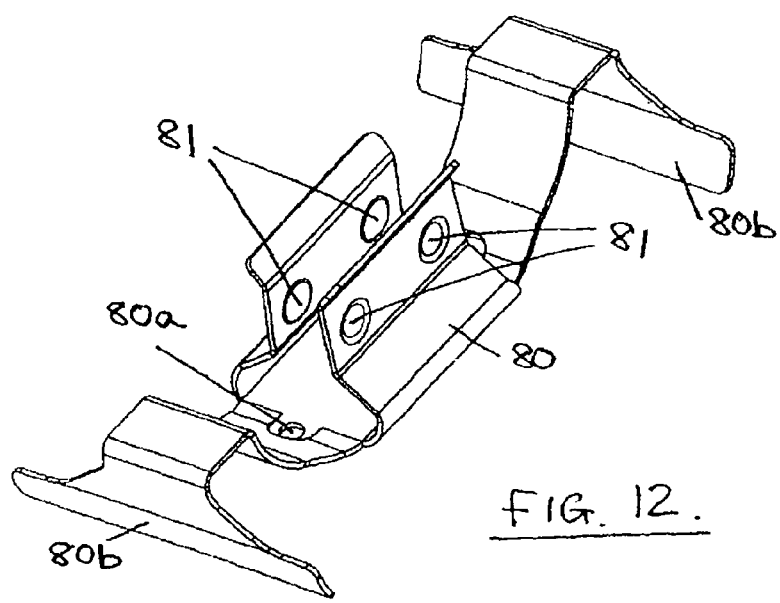
FIG. 12.

DRUM BRAKES

FIELD OF THE INVENTION

This invention relates to drum brakes having a pair of brake shoes moveable radially outwardly into contact with an associated brake drum to provide a handbrake function by a cross strut which acts between the brake shoes or between pivoting brake operating levers which actuate the brake shoes, a handbrake lever pivoted on one brake shoe or brake operating lever contacting one end of the strut to displace the other brake shoe or brake operating lever towards the drum to apply the associated shoe against the drum and by reaction through the strut to also force the other brake shoe or brake operating lever toward the drum to apply the other shoe against the drum.

BACKGROUND OF THE INVENTION

Such drum brakes are well known and are hereinafter referred to as being of the kind described. An example of a drum brake of the kind described in which the strut directly contacts the brake shoes is shown in the Applicant's British patent No. GB2407349. Examples of drum brakes in which the shoes are actuated via pivoted brake operating levers are shown in the Applicant's co-pending applications PCT/1B2006/001032 and GB0525585.6.

SUMMARY OF THE INVENTION

It is an object of the present invention to provide an improved form of drum brake of the kind described.

Thus according to the present invention there is provided a drum brake having a pair of brake shoes moveable radially outwardly into contact with an associated brake drum to provide a handbrake function by a cross strut which acts between the brake shoes or between pivoting brake operating levers which actuate the brake shoes, a handbrake lever pivoted on one brake shoe or brake operating lever contacting one end of the strut to displace the other brake shoe or brake operating lever towards the drum to apply the associated shoe against the drum and by reaction through the strut to also force the other brake shoe or brake operating lever toward the drum to apply the other shoe against the drum, the brake being characterised in that the strut is in two parts one part connected for movement with each respective brake shoe or operating lever, the strut parts having inter-engageable formations which when engaged allow the strut to transmit axial force between the shoes or operating levers, bias means for biasing the strut parts apart to disengage the inter-engageable formations to disable the strut, the inter-engageable formations being engaged when the handbrake lever is operated to connect the strut parts to allow the brake to be applied and being disengaged when the hand brake lever is released so that the strut parts can disengage and move apart with the brake shoes or brake operating levers to adjust the effective length of the strut as the brake shoes wear The inter-engaging formations may be engaged by a wedge means which is actuated by the handbrake lever.

One of the strut parts may carry a tubular formation through which the other strut part slides with the inter-engageable formations facing each other, the wedge means also sliding through the tubular formation in a direction generally longitudinal relative to the strut parts, the tubular formation having a cam surface which co-operates with the wedge means to force the inter-engageable formations into engagement when the handbrake lever is pivoted to apply the brake.

The wedge may be connected with said one brake shoe or brake operating lever so that on movement of the handbrake lever the wedge moves relative to the cam surface to force the inter-engageable formations into engagement.

The wedge means may be operated by an actuating lever which is pivoted intermediate its ends on said one brake shoe or said one brake operating lever, one end of the actuating lever being connected with the wedge means and the other end of the lever being connected for pivoting with the handbrake lever when the handbrake lever is pivoted to operate the handbrake function so that the wedge means moves through the tubular formation to co-operate with the cam surface and force the inter-engageable formations into engagement to enable the strut to transmit force between the shoes or brake operating levers to apply the brake.

Preferable the two strut parts have inter-engageable formations in the form of inter-engageable arrays of teeth on confronting surfaces of the strut parts.

Each respective strut part is preferably connected with its respective brake shoe or brake operating lever by a tension spring which pulls the strut part towards its respective brake shoe or operating lever.

The wedge means may be connected with said one end of the wedge actuating lever or said one brake shoe or brake operating lever by spring means which are tensioned when the handbrake lever is pivoted to apply the brake.

In an alternative form both strut parts may slide through a tubular formation, the end of one strut part having a wedge portion which co-operates with a cam surface on the tubular formation to force the inter-engaging formations into engagement when the handbrake lever is pivoted to apply the brake.

In the above alternative, the tubular formation is preferably connected with one end of an actuating lever which is pivoted intermediate its ends on said one brake shoe or dais one brake operating lever, the other end of said actuating lever being connected for pivoting with the handbrake lever when the handbrake lever is pivoted to operate the handbrake function so that the tubular formation moves relative to the strut parts so that the cam surface acts on the wedge portion of said one strut part to force the inter-engaging formations into engagement to enable the strut to transmit force between the shoes or brake operating lever to apply the brake. Also the tubular formation may be connected with the actuating lever by a spring means.

In a still further form the two strut parts may be pivoted away from each other to disengage the inter-engaging formations by the bias means and are pivoted towards each other to engage the inter-engaging formations when the handbrake lever is operated to apply the brake.

In such an arrangement the two strut parts are preferably pivoted away from each other by spring means which maintain an abutment surface on one strut part in contact with a co-operating abutment surface on one brake shoe or operating lever when the handbrake lever is released, the abutment surfaces being shaped and positioned so that said spring means generates a turning movement to pivot said one strut part relative to the other strut part when the abutment surfaces are drawn towards each other by the spring means.

Preferably the handbrake lever when operated to apply the brake acts on said one strut part to apply an opposite turning movement thereto to pivot said one strut part relative to the other strut part and to bring the inter-engageable formations into engagement so that the strut can apply the brake.

Preferably also said one strut part is pivotally mounted relative to the other strut part by a pin on one strut part which slides in a slot on the other strut part so that the two strut parts can pivot relative to each other and also slide relative to each other to take account of the movement of the two strut parts when the handbrake lever is released and the change in effective length of the strut as the brake shoes wear.

BRIEF DESCRIPTION OF THE SEVERAL VIEWS OF THE DRAWINGS

The invention will now be described, by way of example only, with reference to the accompanying drawings in which:—

FIG. 6 shows the bracing link used in the brake of FIGS. 1 to 5;

FIG. 7 shows details of the operating lever pivot pins used in the brake of FIGS. 1 to 5;

FIGS. 8 and 9 show details of an alternative pressed metal bracing link;

FIG. 10 shows in diagrammatic form the deflection of the pivot levers in a brake which does not have the bracing link of FIG. 6 or 8 and 9;

FIGS. 11 to 13 show details of an arrangement used for securing a brake pad to an associated operating lever in the brake of FIGS. 1 to 5;

DETAILED DESCRIPTION OF THE INVENTION

Figure 1:
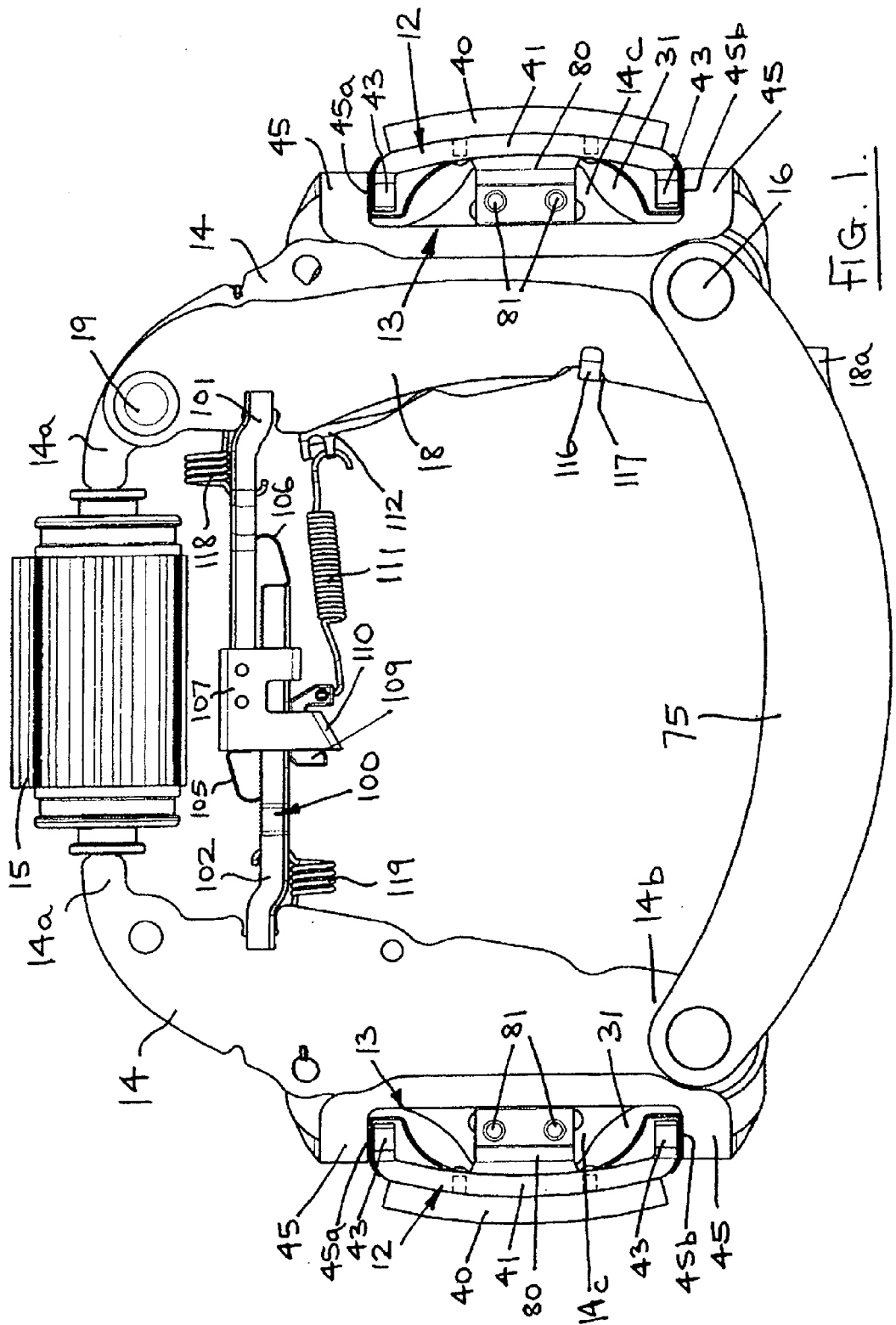
FIG. 1 shows a side view of a brake in accordance with the present invention in an unactuated condition and with the drum and backplate removed.
Figure 2:
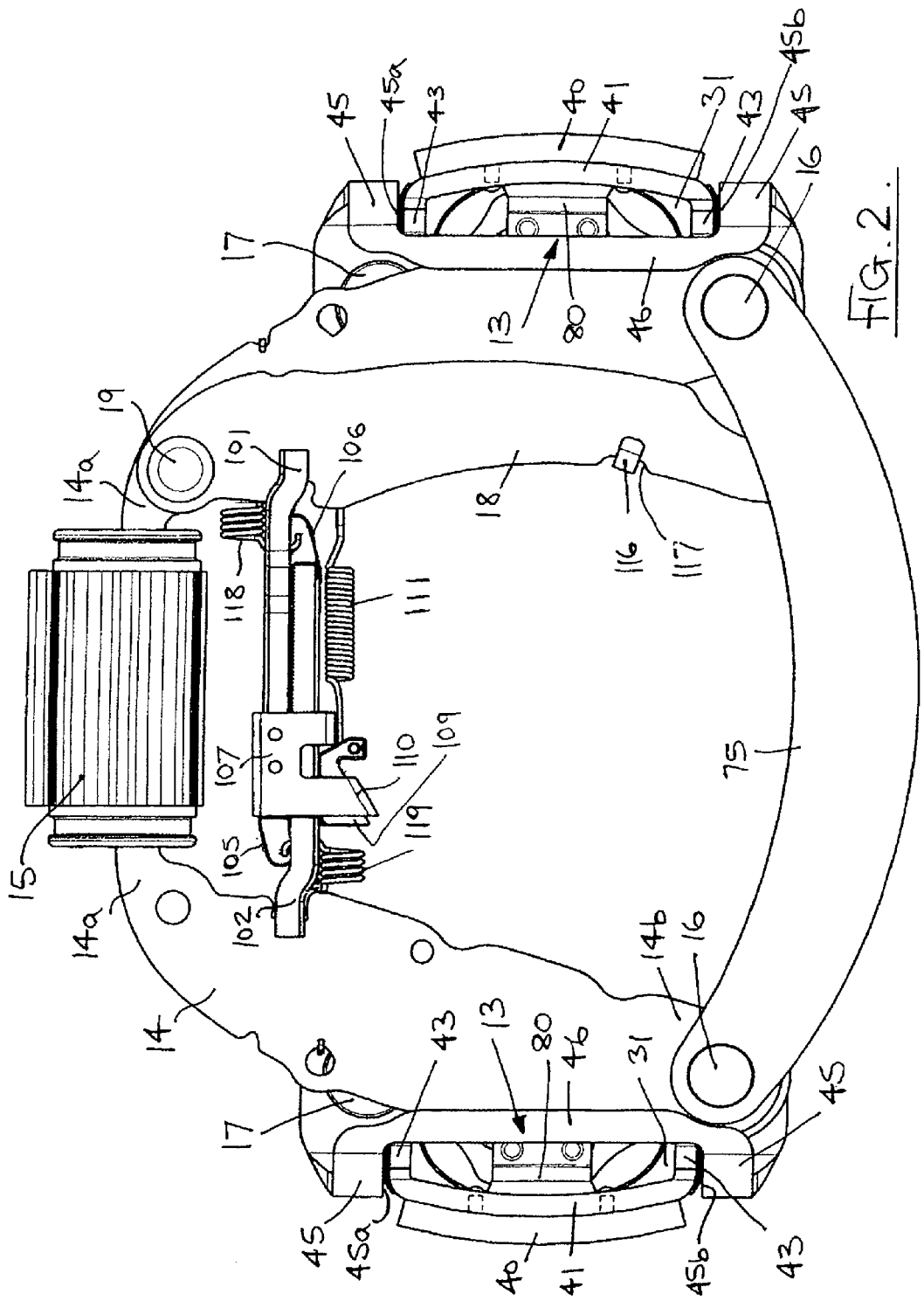
FIG. 2 shows a side view of the brake of FIG. 1 in an actuated condition.
Figure 3:
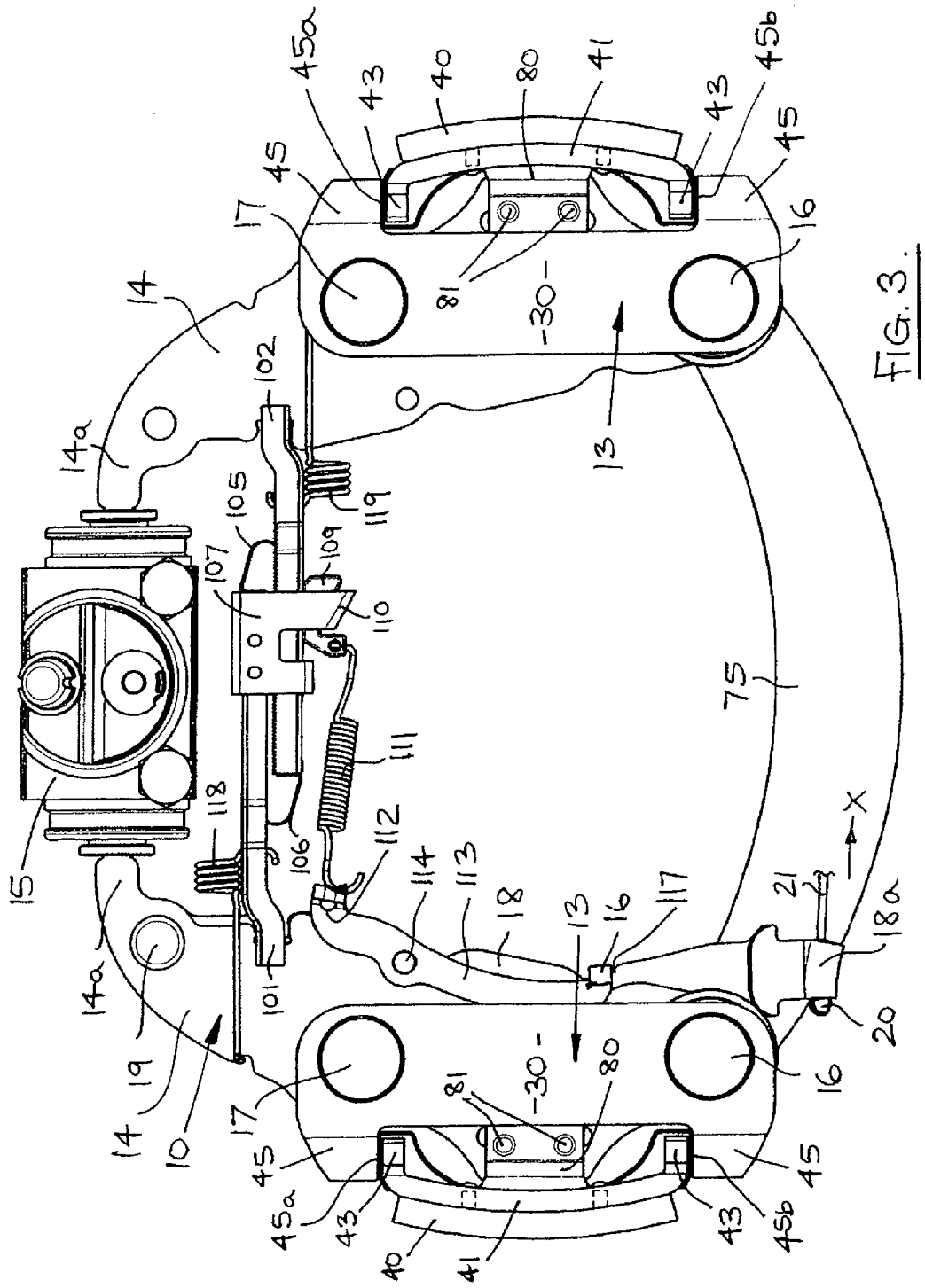
FIG. 3 shows a side view of the brake of FIG. 1 viewed from the other side.

Referring to the drawings, there is shown a drum brake of the type described in the Applicant's co-pending PCT patent application No. PCT/IB2006/001032 and PCT/IB06/003907.

The brake 10 has a backplate (not shown) on which a pair of brake pads 12 are supported for generally radially outward movement into contact with a associated brake drum (not shown) by abutment structures 13. Each pad is moved radially outward into contact with the drum by an associated operating lever 14 which is acted on at its upper end 14a by a brake applying means in the form of a hydraulic wheel cylinder 15. The lower end 14b of each operating lever is pivoted on the associated abutment structure 13 by a pivot pin 16 which is also used together with a further rivet pin 17 to secure the abutment structure 13 to the backplate.

Pivoted on the right-hand operating lever 14 by a rivet 19 is a handbrake lever 18. The handbrake lever has a U-shaped lower portion 18a which engages with a nipple 20 on the end of a handbrake operating cable 21 in a conventional manner. Alternatively, any other form of connection of the handbrake operating cable to the lower end 18a of lever 18 can be employed. For example, the quick attach arrangement shown in the Applicants patent EP 917630 is suitable.

Each abutment structure 13 is formed as a generally U-shaped channel structure with one side 30 contacting the backplate and the base of the channel having an aperture 31 through which a portion 14c of the respective operating lever 14 extends.

Each brake pad 12 comprises a friction pad 40 and a metal backing/support member 41. The pad supports 41 have ears 43 which contact abutment surfaces 45a or 45b on the abutment structures 13 when the brake is applied depending on the direction of rotation of the drum. This contact reacts the braking torque generated. The abutment surfaces 45a and 45b are provided on abutment portions 45 of each abutment structure 13 and extend across the base of the abutment structure and into the sides of the U-shaped structure adjacent the base to provide a good balanced contact area between the pads 12 and the abutment structure 13. These abutments portions 45 are linked circumferentially by portion 46 of the abutment structure which forms the opposite side 32 of the U-shaped channel structure. This link 46 between the abutment portions 45 braces the abutment portions against relative circumferential deflection when the brake is applied thus better resisting the braking torque generated and providing a more robust brake structure.

The pins 16 which pivotally mount the levers 14 on the backplate are connected by a bracing link 75 which extends between the free ends 16a of the pins 16 to help to control the deflection of the pins 16 relative to the backplate when the brake us applied. The bracing link 75 is curved to increase the clearance around the hub of the associated wheel. In certain installation there may be sufficient space for link 75 to be straight in form.

FIG. 10 shows diagrammatically the tendency of the free ends 16a of the pins 16 to deflect towards each other when the brake is applied (shown in dotted detail). By providing the bracing link 75 this tendency is significantly reduced and thus the stiffness of the brake is greatly improved. This significantly improves the response of the brake since the loss of actuating displacement which occurs (as a result of the deflection of pins 16) if the bracing link 75 is not used is reduced. Also the reduction of the deflection of the mounting pins 16 relative to the backplate helps to reduce the likelihood of any failure of the mounting of the pins on the backplate. The improved stiffness of the brake also allows the thickness of the backplate to be reduced (e.g. from 2.5 mm to 2.0 mm) this significantly reduces the material costs of the brake.

FIG. 7 shows the detail of one of the pins 16. The free end 16a of the pin is riveted over to secure the bracing link 75 against a first shoulder 16c on each pin. When the brake is assembled the other end of each pin 16 is riveted against backplate 11 at 16d to sandwich the side 30 of each abutment structure 13 between the backplate and a second shoulder 16e on each pin. Lever 14 is pivoted on portion 16f of each pin between a spacing washer and a third shoulder 16g of each pin.

FIGS. 8 and 9 show an alternative form of bracing link 75 which is formed by pressing and which includes a longitudinally extending stiffening formation in the form of a pressed ridge 76.

FIGS. 11 to 13 show a construction for securing brake pads 12 to their associated lever 14 using spring clips 80 which are riveted (via holes 80a) or otherwise secured to the back of the brake pads 12. Clips 80 include two or more projections 81 which extend into generally circumferentially extending slots or grooves 82 provided in both sides of each lever 14. In the arrangement shown four such projections are used but only two projections may be used, one on each side of lever 14. Alternatively, only one projection may be used which engages only one slot on one side of lever 14. The pads are thus held onto the levers 14 but are able to move to a limited extent circumferentially relative to the levers (see arrow C in FIG. 11) under braking to occupy the best position relative to lever to ensure good contact between the pad and the associated drum throughout the working life of the pad.

In the arrangement shown in FIGS. 11 to 13 the clips 80 are extended at 80b to clip around the ears 43 of the pad to provide resilient contact between the pads and the abutment surfaces 45a and 45b to reduce pad vibration/noise.

Figure 5:
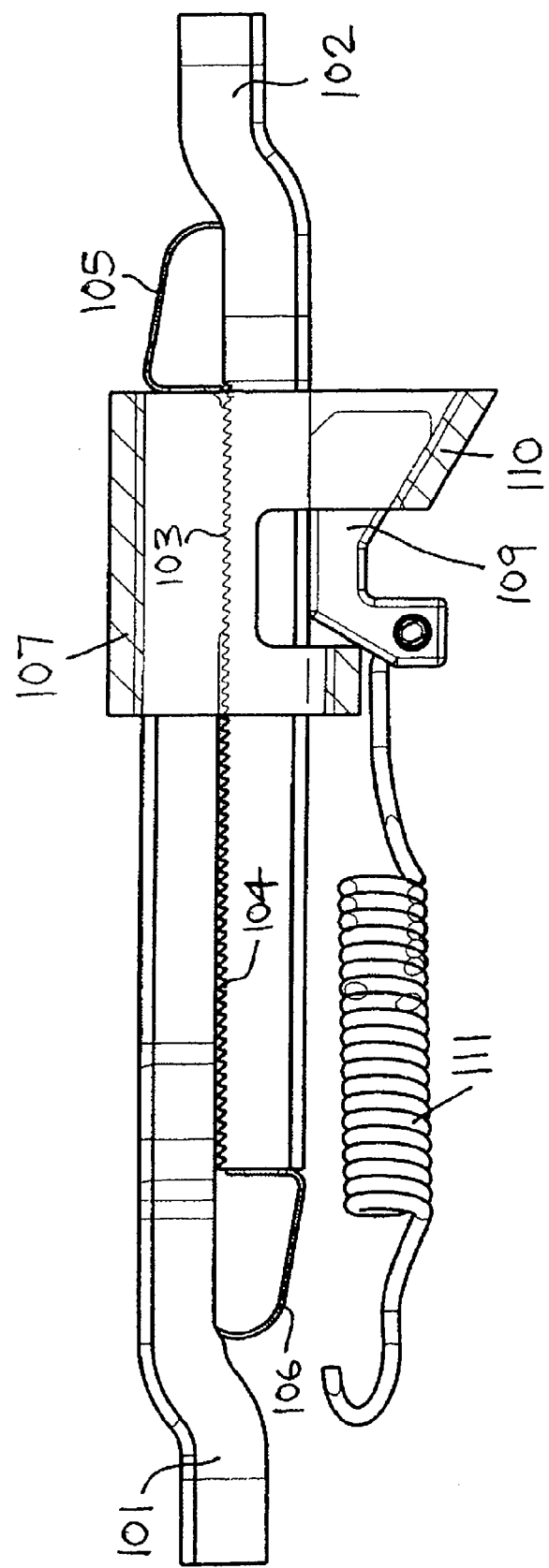
FIG. 5 shows details of a brake actuating strut used in the brake of FIGS. 1 to 4.

In accordance with the present invention a two part strut 100 extends between the handbrake lever 18 and the left-hand operating lever 14 as viewed in FIG. 1. The strut 100 has a first part 101 which is contacted by the handbrake lever 18 and a second part 102 which contacts the left-hand operating lever 14. As best seen in FIG. 5 the adjacent surfaces of parts 101 and 102 have inter-engageable formations in the form of arrays of teeth 103 and 104 respectively. These teeth are normally biased out of engagement with each other by leaf springs 105 and 106 carried on strut parts 101 and 102 respectively. Strut part 101 is pulled towards the right brake operating lever as viewed in FIG. 1 by spring 118 and strut part 102 is pulled towards the left brake operating lever by spring 119.

Figure 4:
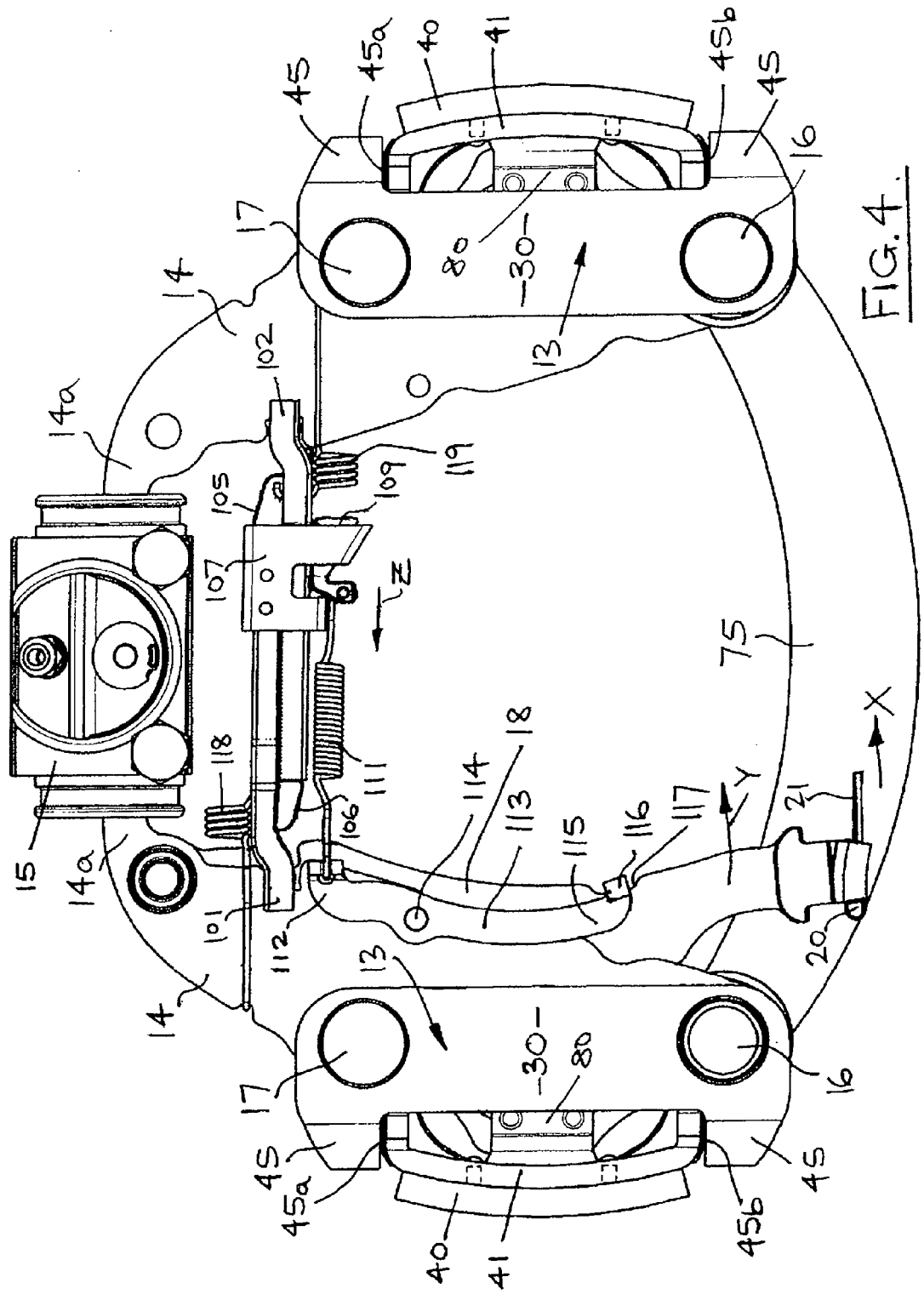
FIG. 4 shows a side view of the brake of FIG. 2 viewed from the other side.

Strut part 101 carries a tubular formation 107 through which strut part 102 extends together with a wedge 109. Tubular formation 107 has an inclined cam portion 110 which co-operates with the wedge 109 to force the teeth arrays 103 and 104 into engagement with each other if the wedge is moved to the left (direction Z) as viewed in FIGS. 4 and 5. When the teeth arrays are engaged the two parts of the strut co-operate so the strut can transmit axial force between the handbrake lever 18 and the left-hand operating lever 14.

The wedge 109 is moved to the left relative to the cam portion 110 to engage the teeth arrays by a spring 111 which is connected to one end 112 of a wedge actuating lever 113 which is pivoted on the right-hand operating lever 14 by a pivot pin 114. The other end 115 of lever 113 has a tang 116 which engages a cut out 117 in the edge of handbrake lever 18 so that when lever 18 is pivoted by the movement of cable 21 in direction of arrow X in FIG. 4 to apply the handbrake function, the lever 113 is pivoted in a counter-clockwise sense as indicated by arrow Y in FIG. 4 to move the wedge 109 in direction Z and engage the teeth arrays 103 and 104 so that the strut 100 can transmit force from lever 18 to the left-hand operating arm 14. This pivots the lever left-hand lever 14 its about pivot 16 to force left-hand pad 12 (as viewed in FIG. 1) into contact with the associated drum. The reaction force of left-hand pad 12 contacting the shoe is transmitted to right-hand lever 14 via pivot pin 19 through strut 100 thus also forcing right-hand brake pad 12 to engage the associated drum so that a full handbrake function is generated.

The use of the wedge actuating lever 113 enables the travel of, and force which is applied to, the wedge 109 from lever 18 to be modified due to the lever ratio applied to lever 113. Also the use of lever 113 applies the force from lever 18 to wedge 109 in the correct direction to engage the teeth on the strut parts.

When the hand brake lever 18 is released wedge 109 moves to the left as viewed in FIG. 1 so that the arrays of teeth 103 and 104 are disengaged under the action of leaf springs 105 and 106 and the disengaged strut parts 101 and 102 follow the movements of levers 14 with which they are connected via springs 118 and 119. Thus as the brake pads 12 wear the position at which the strut parts 101 and 102 are connected when the lever 18 is pivoted is automatically adjusted so that the strut parts engage in a progressively less overlapping configuration. Thus the axial movement of the strut necessary to engage the brake remains substantially constant throughout the entire life of the pads.

Figure 14:
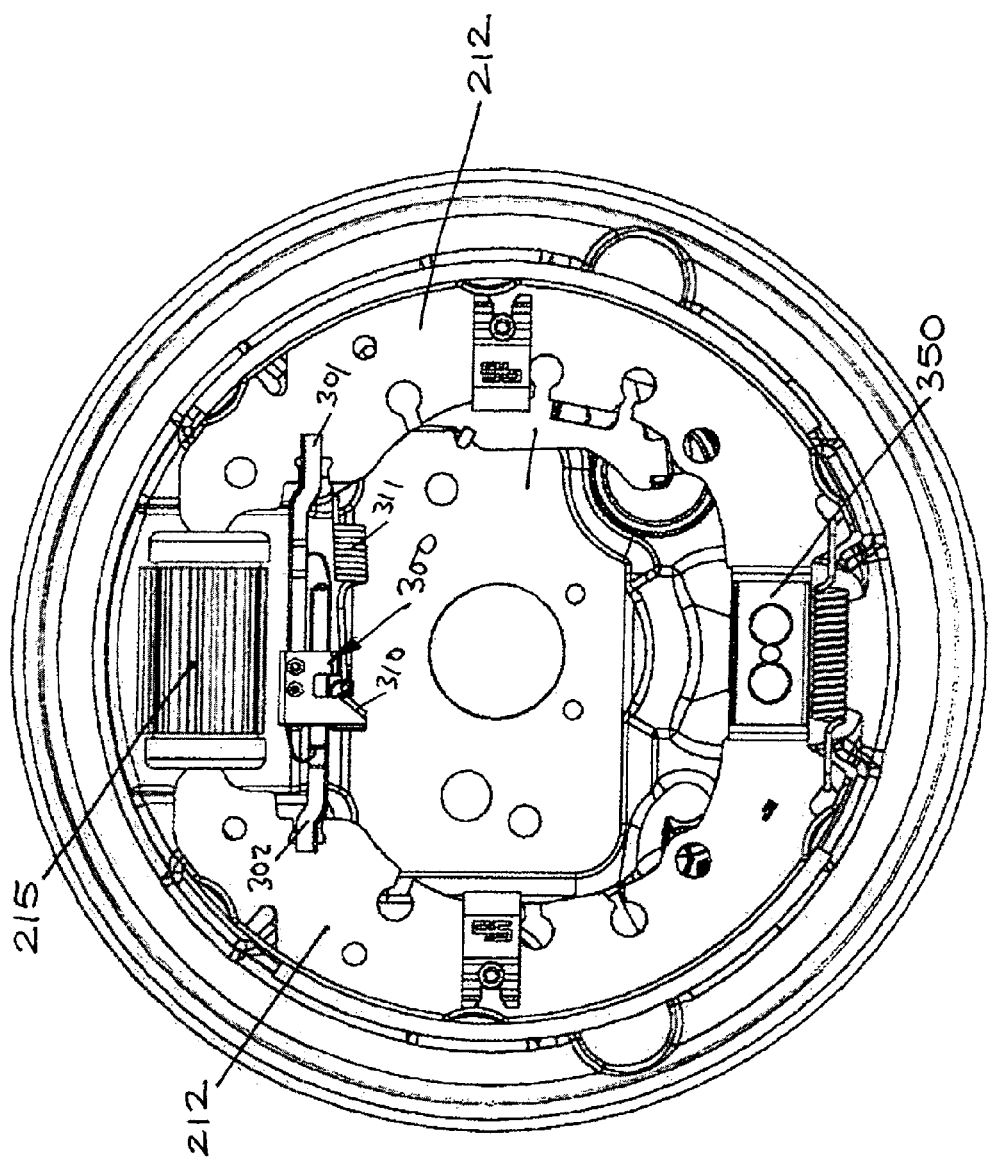
FIG. 14 shows a conventional drum brake which employs an actuating strut in accordance with the present invention.
Figure 15:
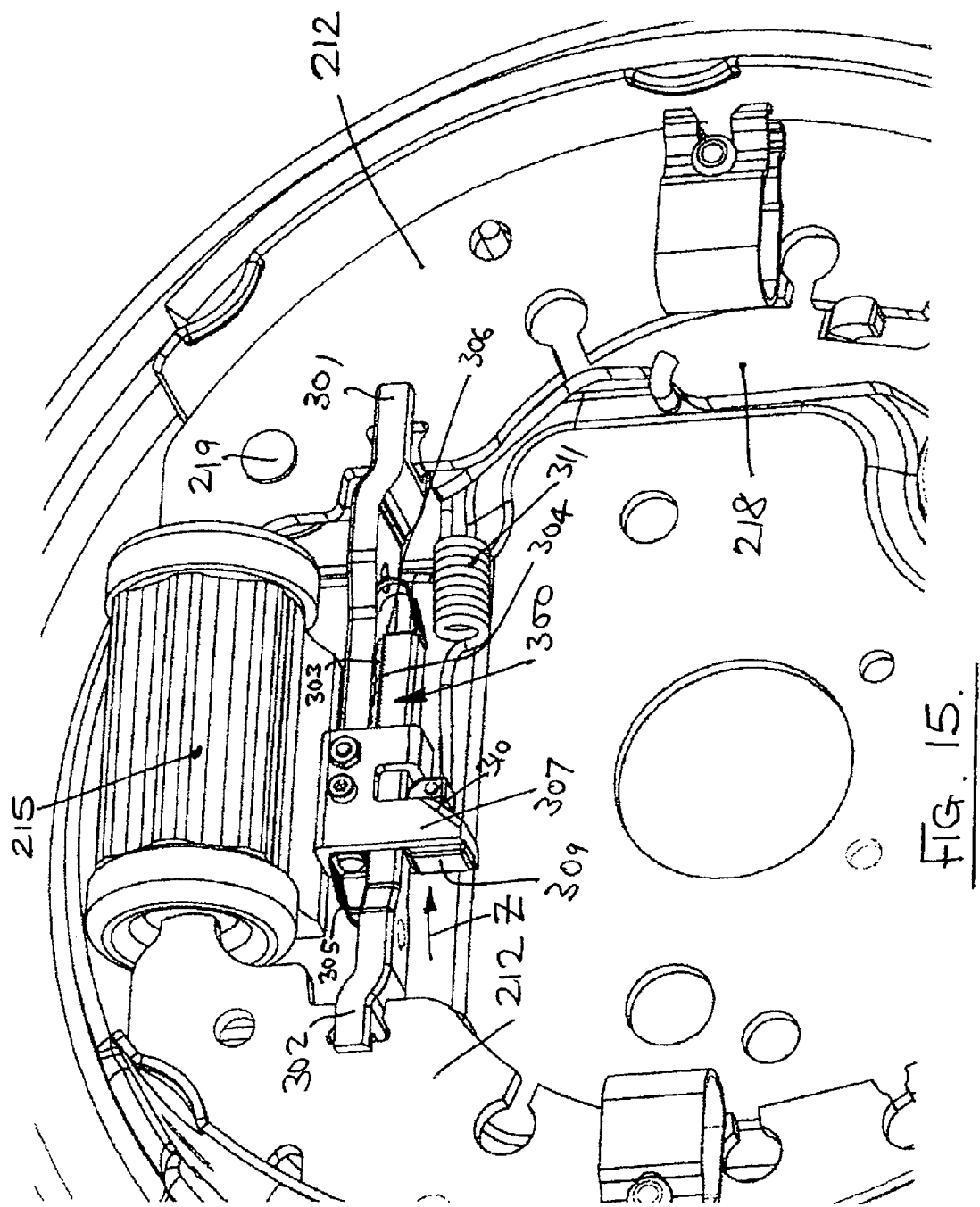
FIG. 15 is a perspective view of part of the brake shown in FIG. 14.

FIGS. 14 and 15 show an alternative form of the present invention as applied to a conventional drum brake having two brakes shoes 212 which can be engaged with the associated drum (not shown) by either a hydraulic cylinder 215 or a handbrake lever 218 which is pivoted on the right hand brake shoe 212 and which operates on the brake shoes via a two part actuating strut 300.

The strut 300 has a first part 301 which is contacted by the handbrake lever 18 and a second part 302 which contacts the left-hand brake shoe 212. As best seen in FIG. 15 the adjacent surfaces of parts 301 and 302 have inter-engageable formations in the form of arrays of teeth 303 and 304 respectively. These teeth are normally biased out of engagement with each other by leaf springs 305 and 306 carried on strut parts 301 and 302 respectively. Strut part 301 is pulled towards the left brake shoe as viewed in FIG. 15 by a spring (not shown) and strut part 302 is pulled towards the right brake shoe by a spring (also not shown).

Strut part 301 carries a tubular formation 307 through which strut part 302 extends. A wedge 309 also extends through tubular formation 307 which has an inclined cam portion 310 which co-operates with the wedge 309 to force the teeth arrays 303 and 304 into engagement with each other if the wedge is moved to the right (direction Z) as viewed in FIG. 15. When the teeth arrays are engaged the two parts of the strut co-operate so the strut can transmit axial force between the handbrake lever 218 and the left-hand brake shoe 212 as previously described with reference to the previous embodiment.

The wedge 309 is moved to the right relative to the cam portion 310 to engage the teeth arrays via a spring 311 which is connected to the right hand brake shoe 212. Thus as lever 218 is pivoted the strut part 301 with the tubular formation 307 is moved to the left as viewed in FIG. 15. Since the wedge is held fixed to the right hand brake shoe 212 the cam portion 310 of tubular formation 307 operates wedge 309 to engage the teeth 303 and 304 so that the strut 300 can transmit force from lever 218 to the left-hand brake shoe 212. This pivots the lever left-hand brake shoe about abutment 350 to force left-hand shoe 212 into contact with the associated drum. The reaction force of left-hand shoe 212 contacting the drum is transmitted to right-hand shoe 212 via the pivot pin 219 of lever 218 thus also forcing right-hand brake shoe 212 to engage the associated drum so that a full handbrake function is generated.

When the brake is released the strut part 301 carrying cam portion 310 moves to the right as viewed in FIG. 15 relative to wedge 309 so that the arrays of teeth 303 and 304 are disengaged under the action of leaf springs 305 and 306 and the disengaged strut parts 301 and 302 follow the retraction movements of shoes 212 with which they are connected via springs (not shown). Thus again as the brake shoe linings 212 wear the position at which the strut parts 301 and 302 are connected when the lever 218 is pivoted is automatically adjusted so that the strut parts engage in a progressively less overlapping configuration. Thus the axial movement of the strut necessary to engage the brake again remains substantially constant throughout the entire life of the linings.

As will be appreciated the arrangement shown in FIGS. 14 and 15 which does not use the wedge actuating lever 113 can also be used in the type of brake shown in FIGS. 1 to 13 by deleting the lever 113 and connecting the wedge 109 to the right hand operating lever 14 via the spring 111.

Figure 16:
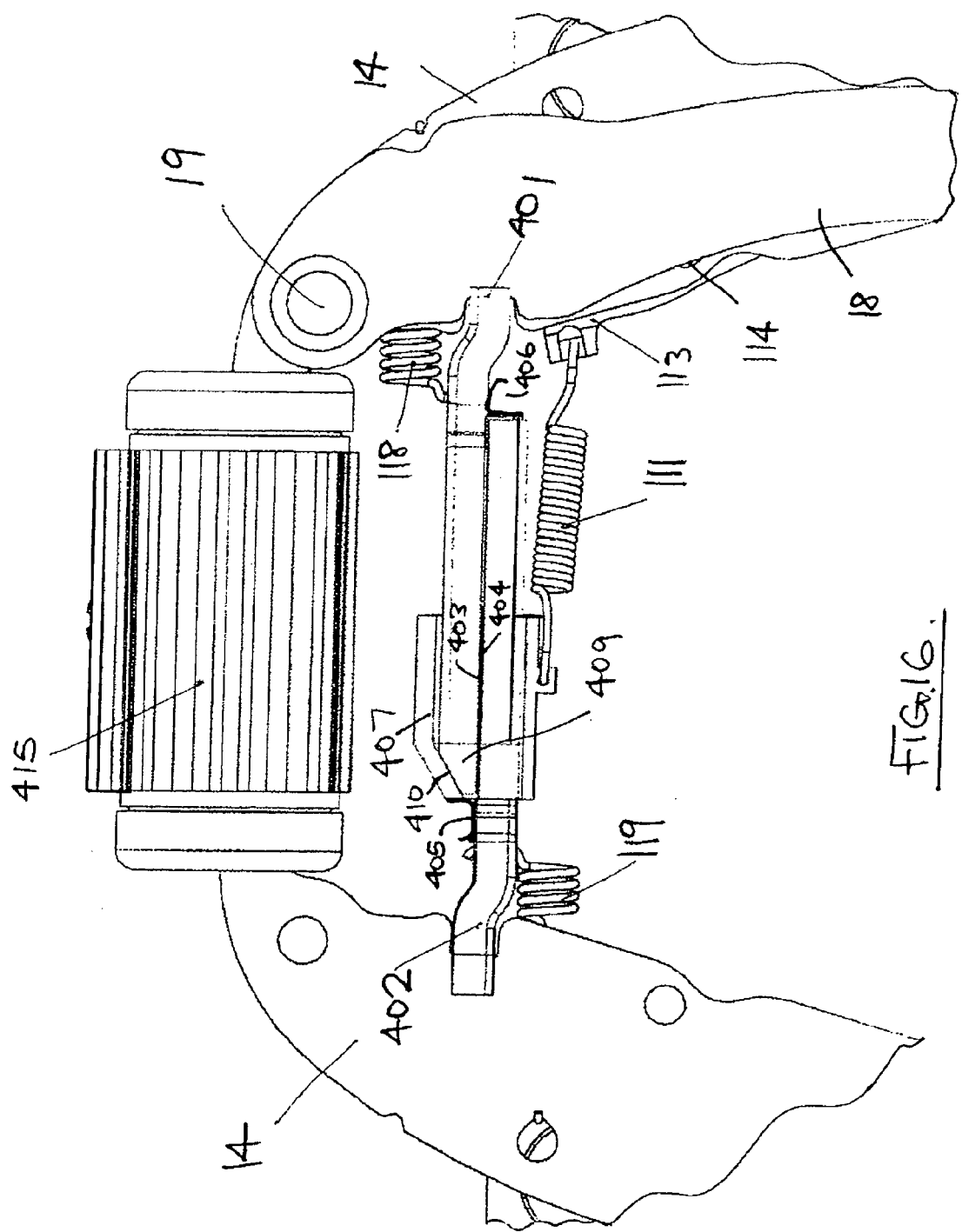
FIG. 16 shows an alternative form of brake actuating strut in accordance with the present invention.
Figure 17:
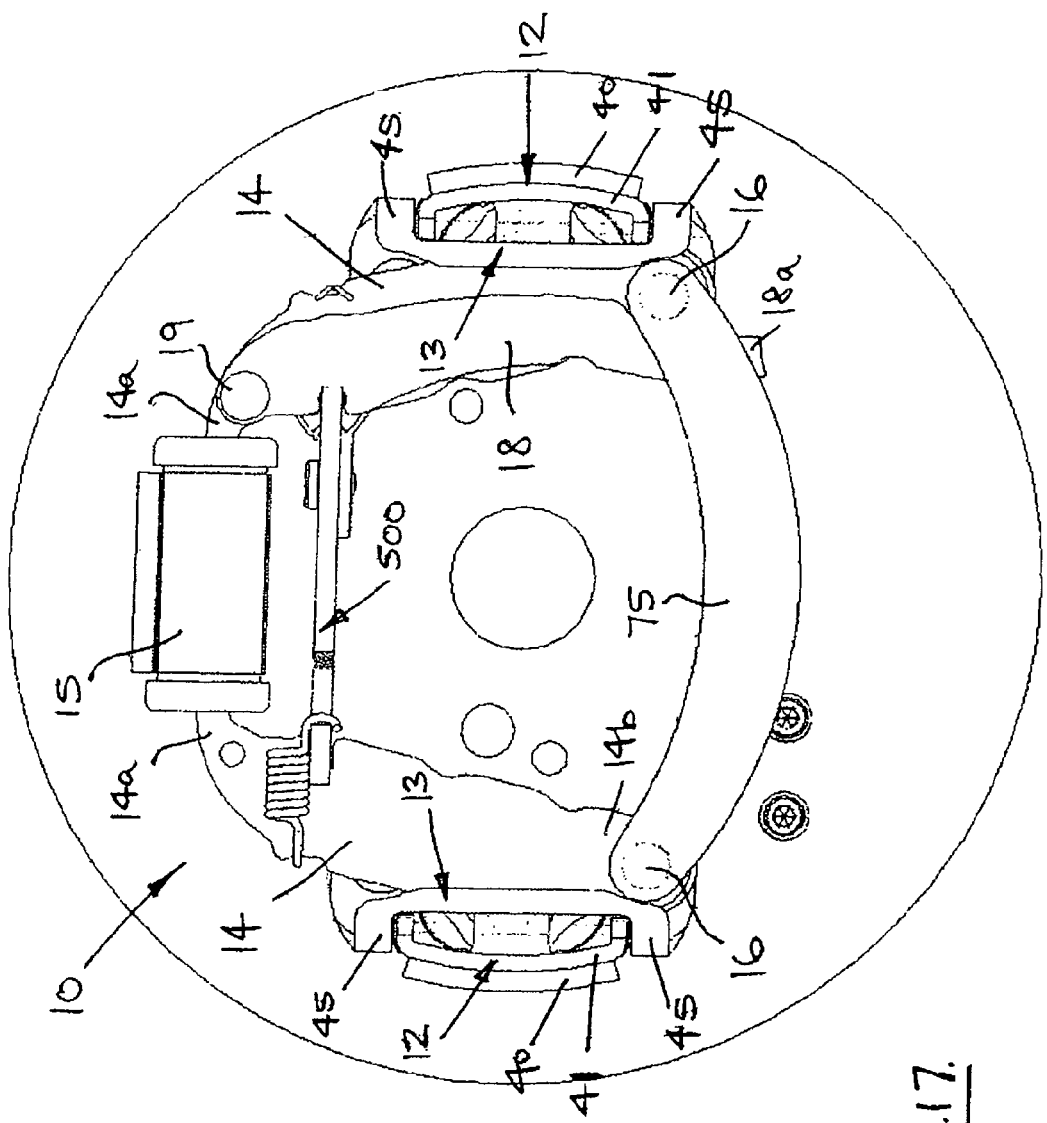
FIG. 17 shows a side view of a brake employing a still further form of actuating strut in accordance with the present invention.
Figure 18:
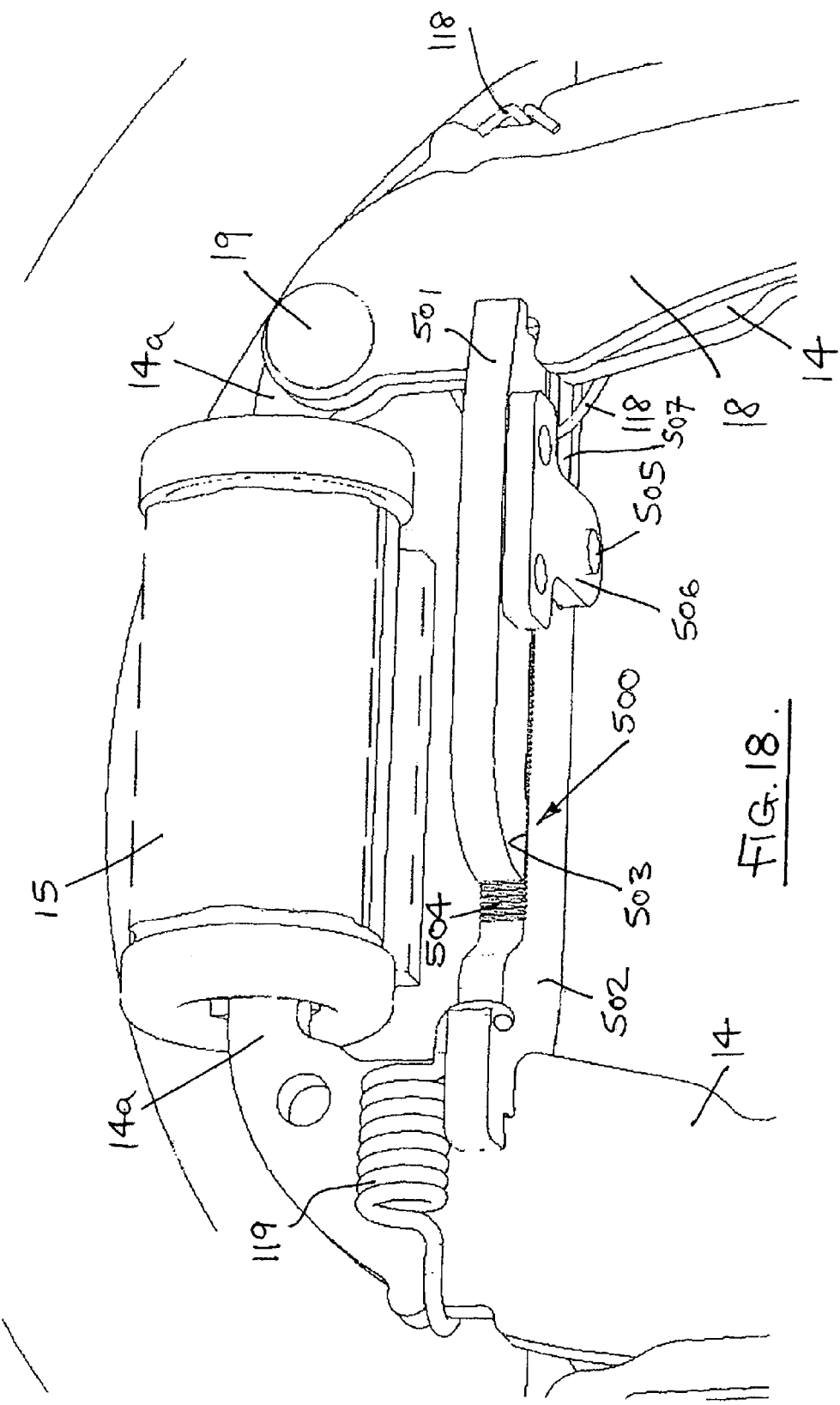
FIG. 18 shows a perspective view of the actuating strut of FIG. 17 on a larger scale.
Figure 19:
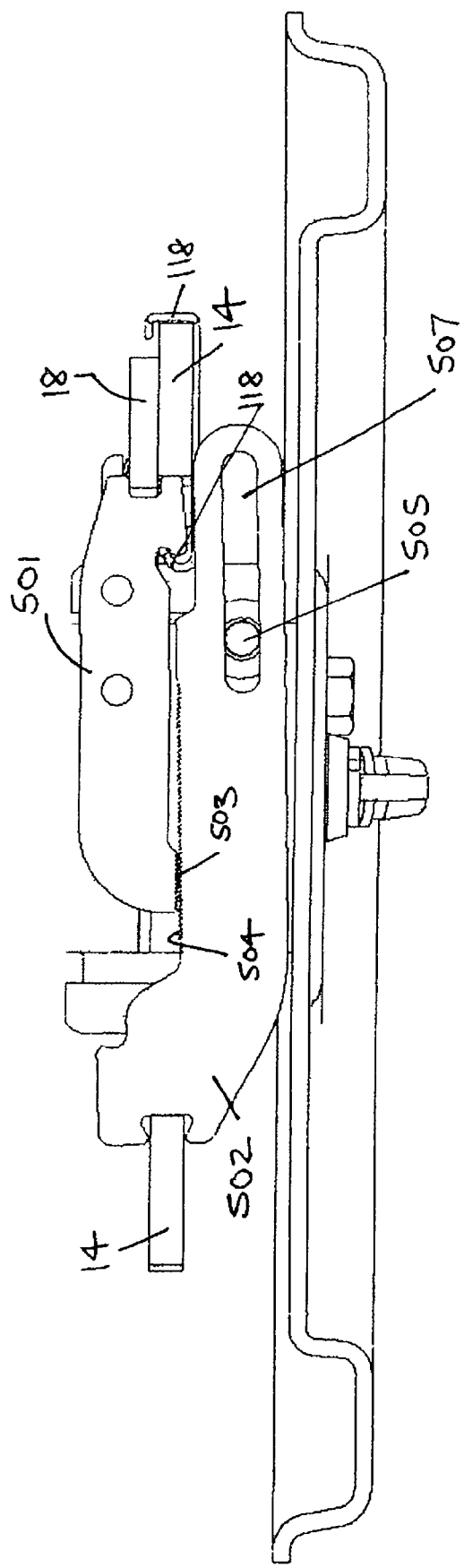
FIG. 19 is a view of the actuating strut of FIG. 18 in the direction of the arrow A showing the strut parts disengaged.
Figure 20:
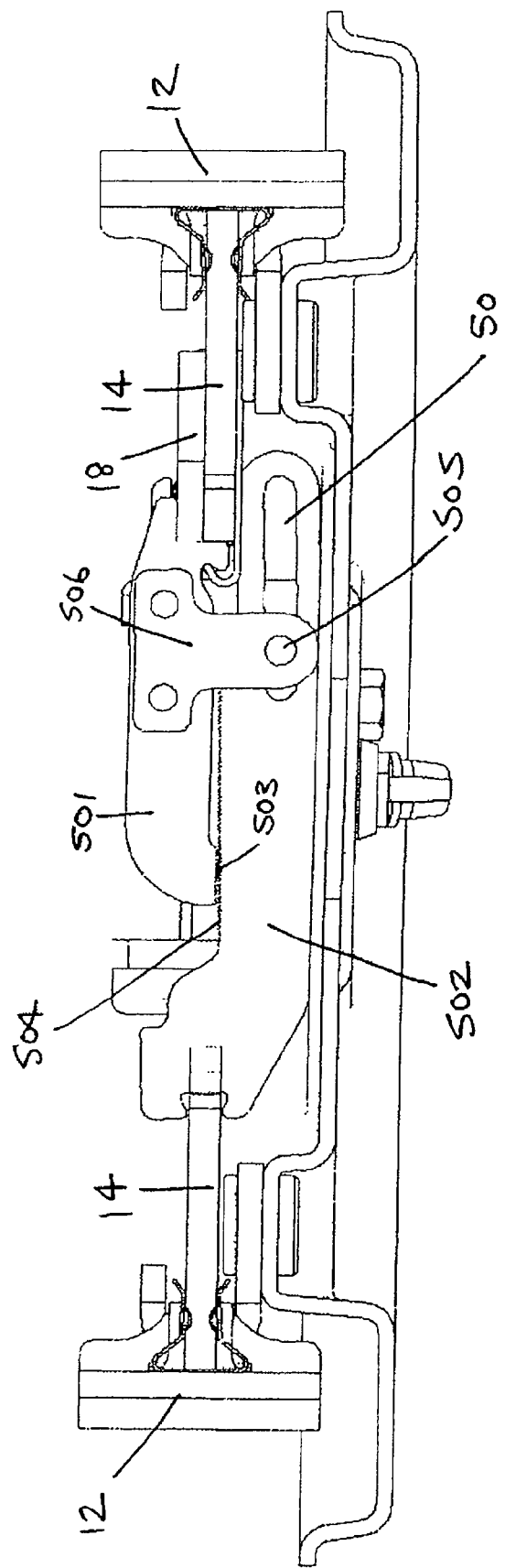
FIG. 20 is a view of the actuating strut of FIG. 18 in the direction of the arrow B also showing the strut parts disengaged.
Figure 21:
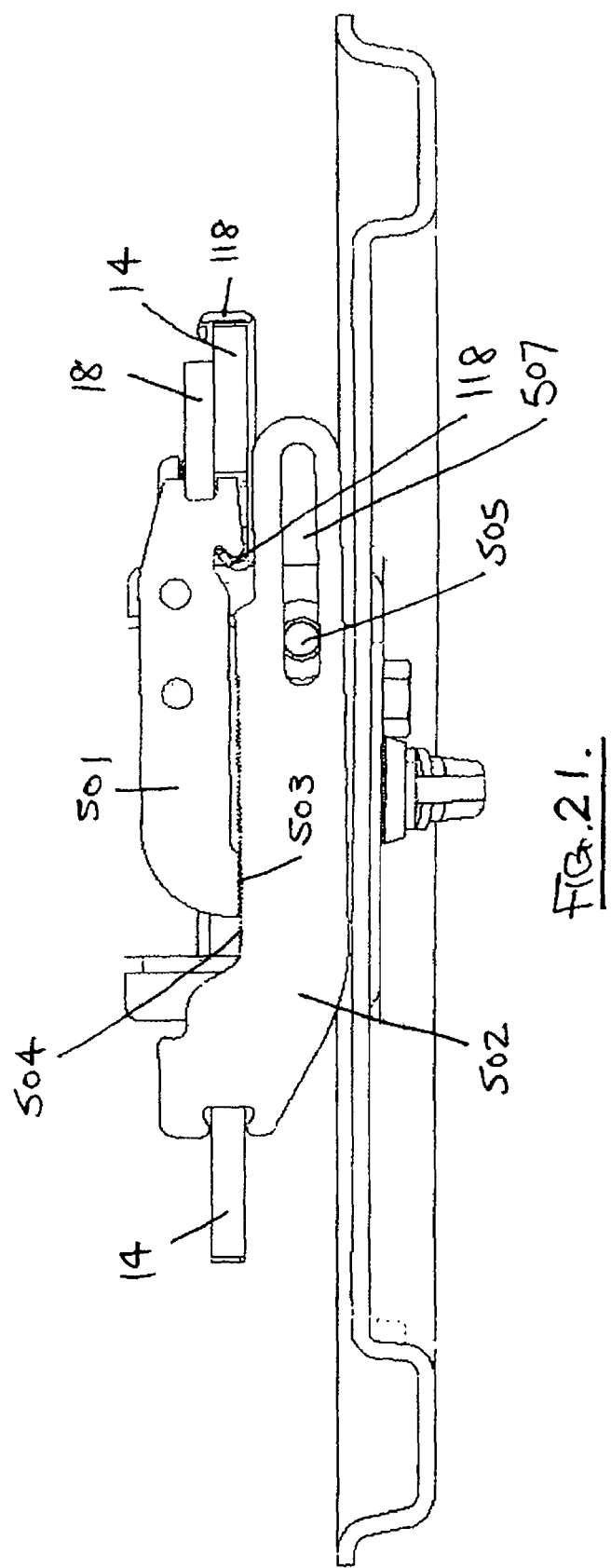
FIG. 21 is a view in the direction of arrow A showing the strut parts engaged.

FIG. 16 shows a further form of strut 400 in accordance with the present invention in which a first strut part 401 is held in contact with the right hand brake operating lever 14 by a spring 118 and a second strut part 402 is held in contact with the left hand brake operating lever 14 by a spring 119. A tubular formation 407 which has a cam portion 410 receives both strut parts 401 and 402 and the end of strut part 401 has a wedge portion 409 which cooperates with cam portion 410. Tubular formation 407 is connected by spring 111 with actuating lever 413 which is pivoted at 414 on hand brake lever 18.

The strut parts 401 and 402 again have teeth arrays 403 and 404 which are wedged into contact with each other when wedge actuating lever 413 (which is pivoted at 414 on lever 18) pulls on tubular formation 407 in response to movement of handbrake lever 18. The teeth arrays 403 and 404 are disengaged when lever 18 is released by leaf springs 405 and 406 respectively.

As will appreciated the strut 400 can be used without actuating lever 413 by deleting lever 413 and connecting wedge 409 to the right hand lever 14 via the spring 111.

Similarly the strut 400 could be used in a conventional drum brake with or without the lever 413 in a similar manner to the strut 300 shown in FIGS. 14 and 15.

Also the type of strut 102, 103 shown in FIGS. 1 to 13 can be used with an actuating lever 113 in a conventional drum brake by mounting the lever 113 directly on the right hand brake shoe.

FIGS. 17 to 26 show a still further form of strut 500 in accordance with the present invention in which the strut 500 has a first strut part 501 which is held in contact with the right hand brake operating lever 14 by a spring 118 and a second strut part 502 which is held in contact with the left hand brake operating lever 14 by a spring 119. The strut parts 501 and 502 have teeth arrays 503 and 504 which are brought into contact with each other when the handbrake lever 18 is operated to engage the brake.

The strut part 501 is pivotally mounted on the strut part 502 by a pin 505 mounted on a support bracket 506 which is secured to strut part 501. Pin 505 extends into a longitudinally extending slot 507 formed in the strut part 502. Thus, as will be described below, the strut part 501 can pivot relative to the strut part 502 through a small angle sufficient to disengage the teeth 503 and 504 and can also slide relative to the part 502 so that the strut parts 501 and 502 can follow the associated brake operating levers 14 when the handbrake lever 18 is released and the two strut parts can move relative to each other to accommodate wear of the associated brake pads throughout the life of the brake.

Figure 22:
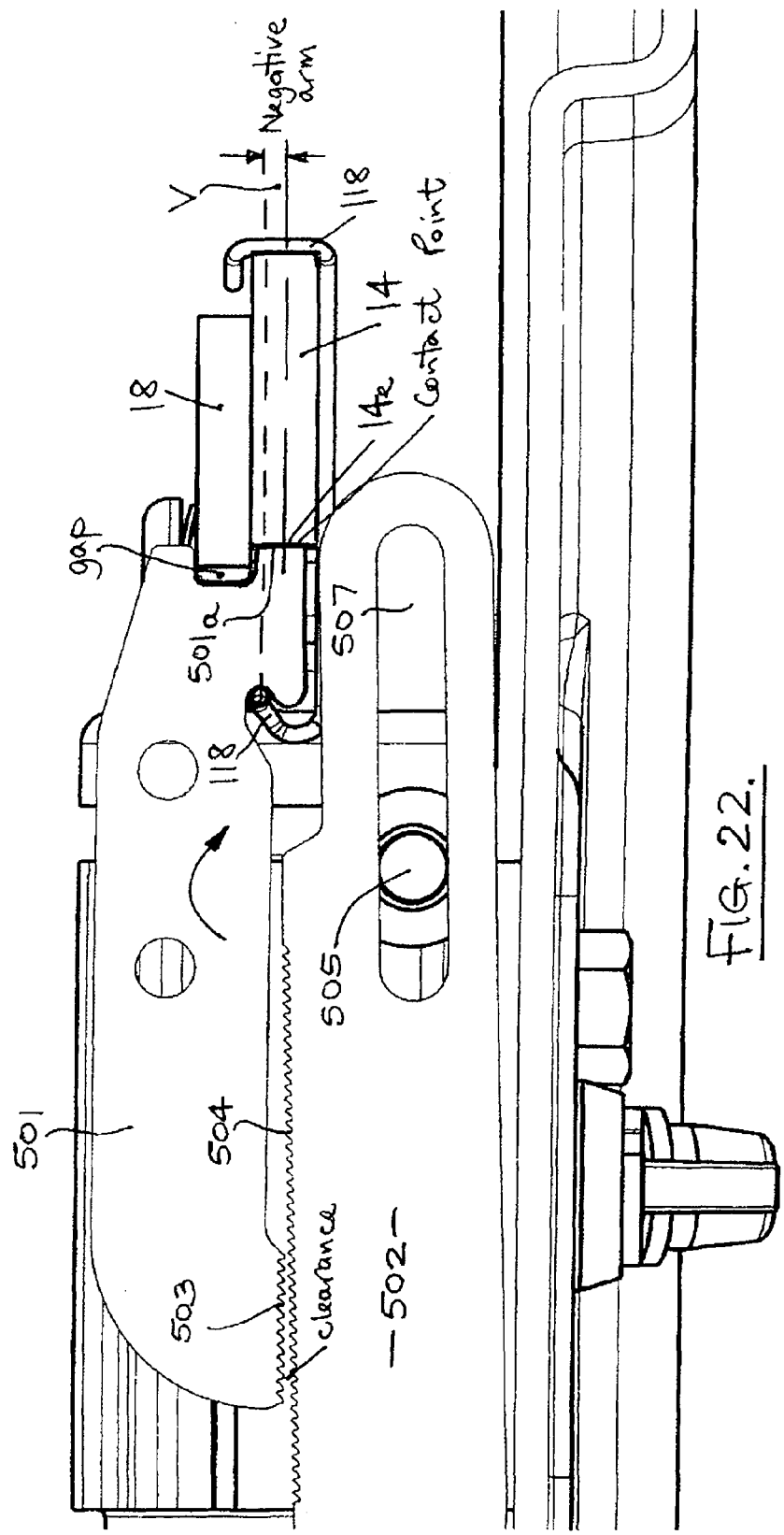
FIGS. 22 and 23 are enlarged views of part of FIGS. 19 and 20 respectively.
Figure 23:
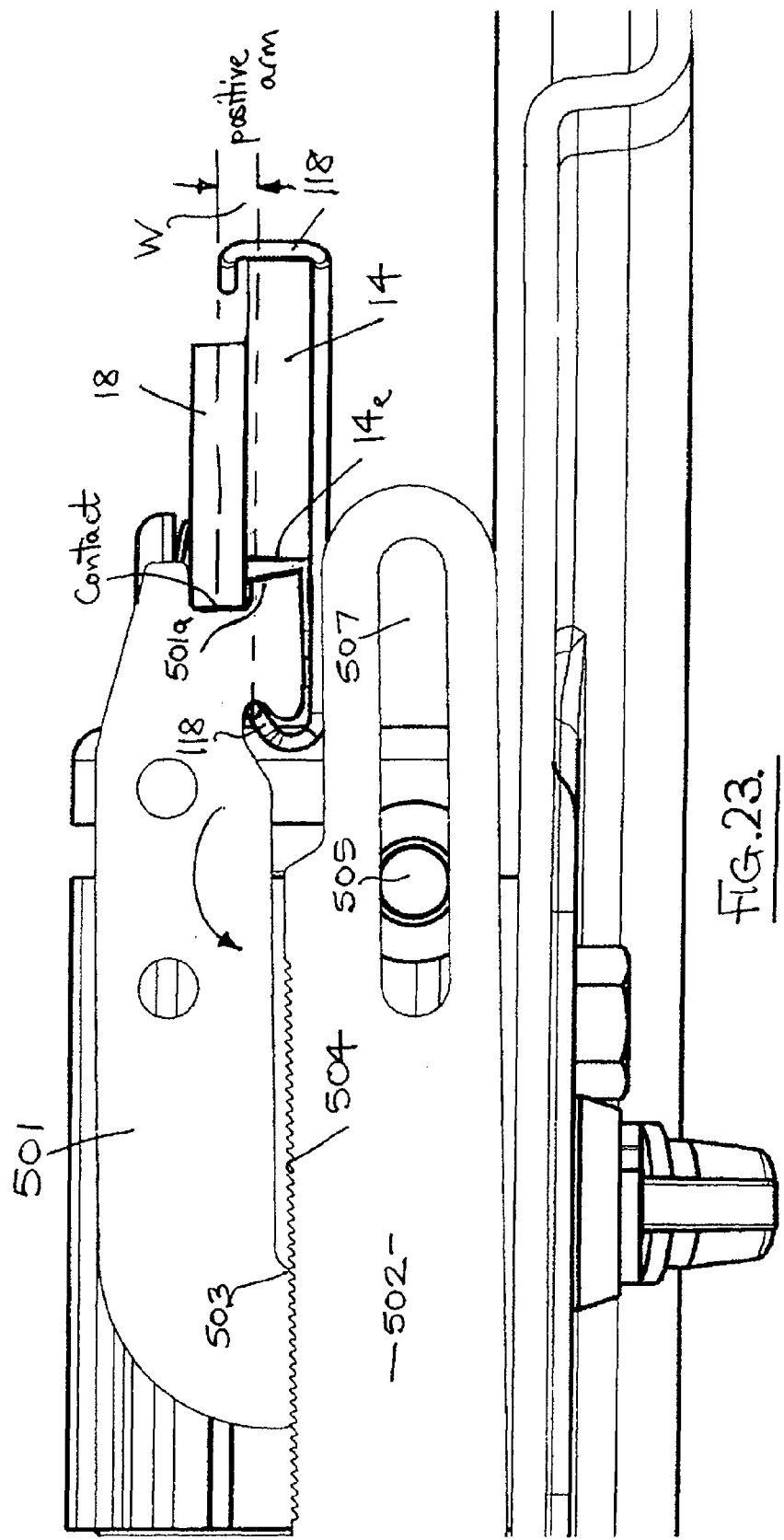
Figure 24:
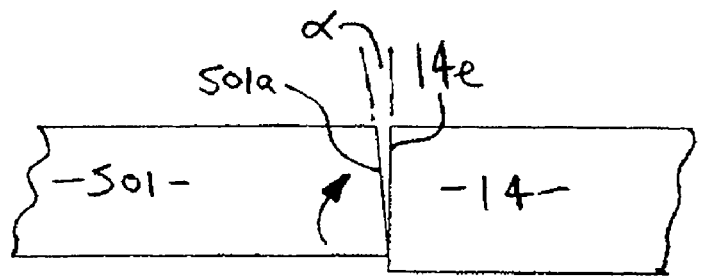
FIGS. 24 and 25 show details of abutment surfaces on one of the strut parts and the associated brake shoe which cause pivoting of the strut parts when engaged.
Figure 25:
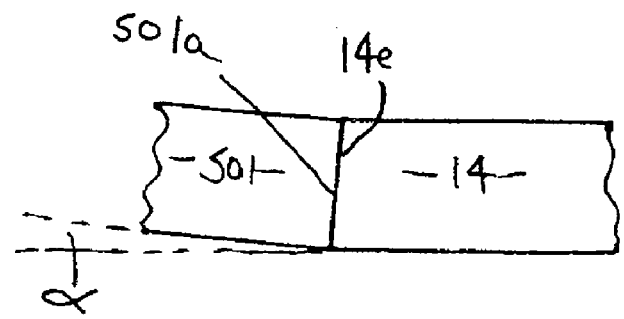

As best seen in FIGS. 22 to 25, the strut part 501 has an inclined abutment surface 501a (see FIG. 24) which is forced against the edge 14e of the right hand brake operating lever 14 under the action of a spring 118. This causes the strut part 501 to pivot anti-clockwise relative to the strut part 502 about pin 505 as shown in FIGS. 22 and 25 so that the teeth 502 and 504 are not engaged and the two strut parts 501 and 502 can follow the retracting movement of the brake operating levers when the handbrake is released or the brake is applied hydraulically. This pivoting of the strut part 501 to disengage the teeth 503 and 504 is caused by the small negative moment arm V of the spring 118 which is marked in FIG. 22.

When the handbrake lever 18 is operated to apply the brake, the handbrake lever applies a positive moment to the handbrake part 501 causing the part 501 to pivot relative to the part 502 in a anti-clockwise sense about pin 505 to engage the teeth 503 and 504 and thus allow the strut 500 to apply the brake. This positive moment is shown at W in FIG. 23.

Figure 26:
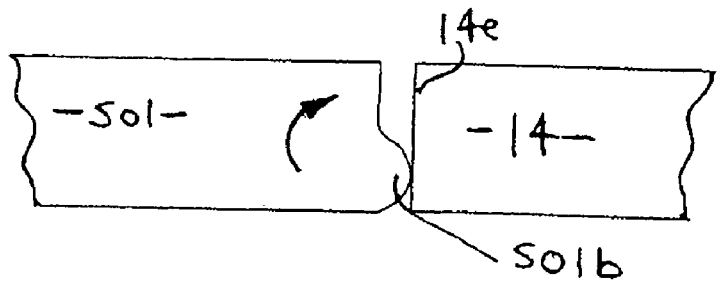
FIG. 26 shows an alternative abutment arrangement.

FIG. 26 shows an alternative form of abutment 501b which could be used on the strut part 501 to again generate a negative turning moment to disengage the teeth 503 and 504 under the action of spring 118.

As will be appreciated, the alternative form of adjuster strut 500 described above has the benefit of not relying on a wedging action to engage the teeth on the strut parts.

If desired, an additional bias means to assist the spring 118 may be provided to tend to disengage the teeth 503 and 504 when the handbrake lever is released. This additional bias means may operate directly between the strut parts 501 and 502 to the left of the pivot pin 505 to provide a more positive disengagement with the teeth.

Figure 27:
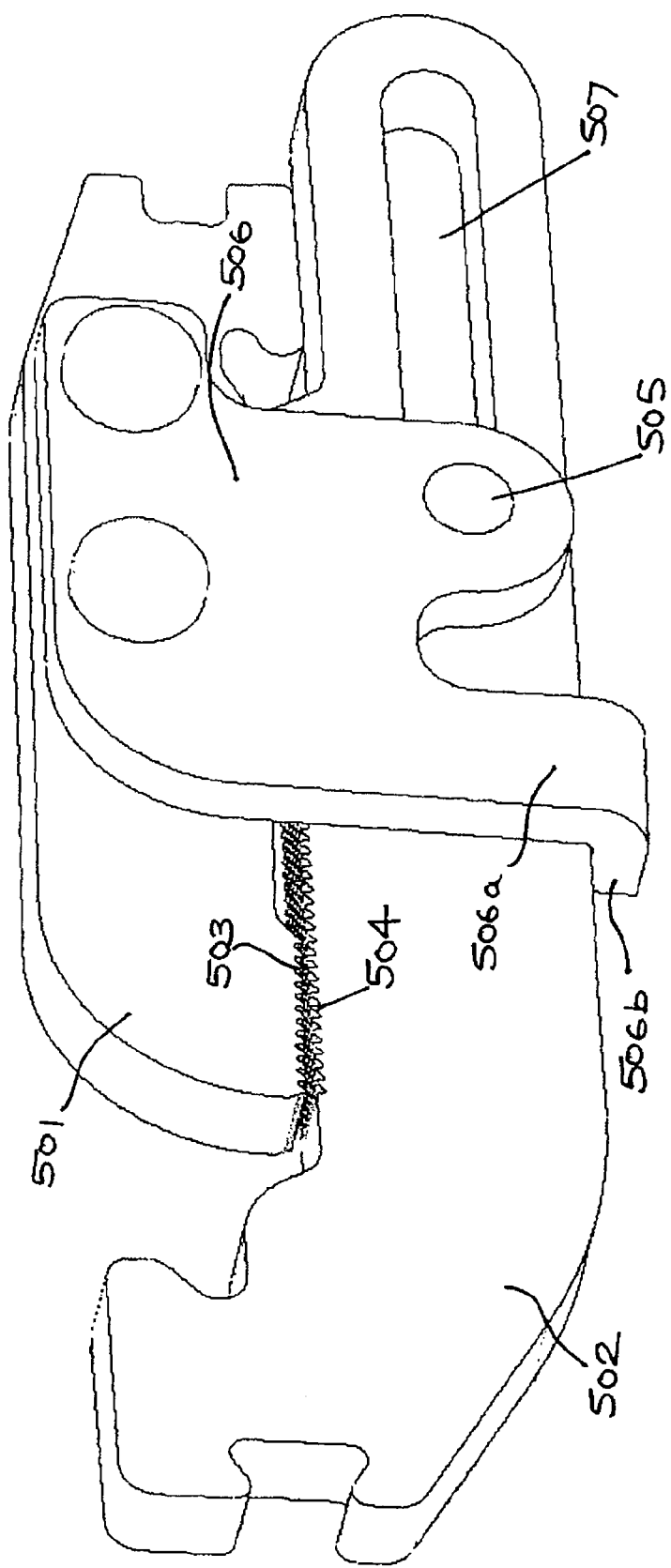
FIG. 27 shows a modified form of the strut shown in FIGS. 17 to 26.

FIG. 27 shows a modified form of the strut shown in FIGS. 17 to 26 in which the support bracket 506 includes an additional guide arm 506a which helps to ensure that the teeth 503 and 504 remain in better alignment during pivoting of the strut parts 501 and 502. Arm 506a also includes a projection 506b which acts as a stop to limit the pivoting of the two strut parts 501 and 502 away from each other as shown in FIG. 27 which shows the teeth 503 and 504 disengaged.

What is claimed is:

1. A drum brake having a pair of brake shoes moveable radially outwardly into contact with an associated brake drum to provide a handbrake function by a cross strut which acts between pivoting brake operating levers which actuate the brake shoes, a handbrake lever pivoted on one brake operating lever contacting one end of the strut to displace the other brake operating lever towards the drum to apply the associated shoe against the drum and by reaction through the strut to also force the other brake operating lever toward the drum to apply the other shoe against the drum, wherein the strut is in two parts one part connected for movement with each respective brake operating lever, the strut parts having inter-engageable formations which when engaged allow the strut to transmit axial force between the brake operating levers, bias means for biasing the strut parts apart to disengage the inter-engageable formations to disable the strut, the inter-engageable formations being engaged when the handbrake lever operated to connect the strut parts to allow the brake to be applied and being disengaged when the hand brake lever is released so that the strut parts can disengage and move apart with the brake operating levers to adjust the effective length of the strut as the brake shoes wear.

2. A brake according to claim 1 in which inter-engageable formations are engaged by a wedge means which is actuated by the handbrake lever.

3. A brake according to claim 2 in which one of the strut parts carries a tubular formation through which the other strut part slides with the inter-engageable formations facing each other, the wedge means also sliding through the tubular formation in a direction generally longitudinal relative to the strut parts, the tubular formation having a cam surface which co-operates with the wedge means to force the inter-engageable formations into engagement when the handbrake lever is pivoted to apply the brake.

4. A brake according to claim 3 in which the wedge means is connected with said brake operating lever so that on movement of the handbrake lever the wedge means moves relative to the cam surface to force the inter-engageable formations into engagement.

5. A brake according to claim 3 in which the wedge means is operated by an actuating lever which is pivoted intermediate its ends on said one said one brake operating lever, one end of the actuating lever being connected with the wedge means and the other end of the lever being connected for pivoting with the handbrake lever when the handbrake lever is pivoted to operate the handbrake function so that the wedge means moves through the tubular formation to co-operate with the cam surface and force the inter-engageable formations into engagement to enable the strut (100) to transmit force between the brake operating levers to apply the brake.

6. A brake according to claim 1 in which each respective strut part is connected with its respective brake operating lever by a tension spring which pulls the strut part towards its respective brake operating lever.

7. A brake according to claim 1 in which the wedge means connected with said one end of the wedge actuating lever or said one brake operating lever by spring means which are tensioned when the handbrake lever is pivoted to apply the brake.

8. A brake according to claim 2 in which both strut parts slide through a tubular formation, the end of one strut part having a wedge portion which co-operates with a cam surface on the tubular formation to force the inter-engaging formations into engagement when the handbrake lever is pivoted to apply the brake.

9. A brake according to claim 8 in which the tubular formation is connected with one end of an actuating lever which is pivoted intermediate its ends on said one brake operating lever, the other end of said actuating lever being connected for pivoting with the handbrake lever when the handbrake lever is pivoted to operate the handbrake function so that the tubular formation moves relative to the strut parts so that the cam surface acts on the wedge portion of said one strut part to force the inter-engaging formations into engagement to enable the strut to transmit force between the brake operating lever to apply the brake.

10. A brake according to claim 9 in which the tubular formation is connected with the actuating lever by a spring means.

11. A brake according to claim 1 in which the strut parts are pivoted away from each other to disengage the inter-engaging formations by the bias means and are pivoted towards each other to engage the inter-engaging formations when the handbrake lever is operated to apply the brake.

12. A brake according to claim 11 in which the two strut parts are pivoted away from each other by spring means which maintain an abutment surface on one strut part in contact with a co-operating abutment surface on one brake or operating lever when the handbrake lever is released, the abutment surfaces being shaped and positioned so that said spring means generates a turning movement to pivot said one strut part relative to the other strut part when the abutment surfaces are drawn towards each other by the spring means.

13. A brake according to claim 11 in which the handbrake lever when operated to apply the brake acts on said one strut part to apply an opposite turning movement thereto to pivot said one strut part relative to the other strut part and to bring the inter-engageable formations into engagement so that the strut can apply the brake.

14. A brake according to claim 11 in which said one strut part is pivotally mounted relative to the other strut part by a pin on one strut part which slides in a slot on the other strut part so that the two strut parts can pivot relative to each other and also slide relative to each other to take account of the movement of the two strut parts when the handbrake lever is released and the change in effective length of the strut as the brake shoes wear.

15. A brake according to claim 1 in which the inter-engaging formations comprise inter-engageable arrays of teeth. on confronting surfaces of the two strut parts.

16. A drum brake having a pair of brake shoes moveable radially outwardly into contact with an associated brake drum to provide a handbrake function by a cross strut which acts between brake shoes, a handbrake lever pivoted on one brake shoe contacting one end of the strut to displace the other brake shoe towards the drum to apply the associated shoe against the drum and by reaction through the strut to also force the other brake shoe toward the drum to apply the other shoe against the drum, wherein the strut is in two parts one part connected for movement with each respective brake shoe, the strut parts having inter-engageable formations which when engaged allow the strut to transmit axial force between the shoes, bias means for biasing the strut parts apart to disengage the inter-engageable formations to disable the strut, the inter-engageable formations being engaged when the handbrake lever is operated to connect the strut parts to allow the brake to be applied and being disengaged when the hand brake lever is released so that the strut parts can disengage and move apart with the brake shoes to adjust the effective length of the strut as the brake shoes wear.

17. A brake according to claim 16 in which inter-engageable formations are engaged by a wedge means which is actuated by the handbrake lever, and one of the strut parts carries a tubular formation through which the other strut part slides with the inter-engageable formations facing each other, the wedge means also sliding through the tubular formation in a direction generally longitudinal relative to the strut parts, the tubular formation having a cam surface which co-operates with the wedge means to force the inter-engageable formations into engagement when the handbrake lever is pivoted to apply the brake.

18. A brake according to claim 17 in which the wedge means is connected with said one brake shoe so that on movement of the handbrake lever the wedge means moves relative to the cam surface to force the inter-engageable formations into engagement.

19. A brake according to claim 17 in which the wedge means is operated by an actuating lever which is pivoted intermediate its ends on said one brake shoe, one end of the actuating lever being connected with the wedge means and the other end of the lever being connected for pivoting with the handbrake lever when the handbrake lever is pivoted to operate the handbrake function so that the wedge means moves through the tubular formation to co-operate with the cam surface and force the inter-engageable formations into engagement to enable the strut (100) to transmit force between the shoes to apply the brake.

20. A brake according to claim 16 in which both strut parts slide through a tubular formation, an end of one strut part having a wedge portion which co-operates with a cam surface on the tubular formation to force the inter-engaging formations into engagement when the handbrake lever is pivoted to apply the brake.

21. A brake according to claim 20 in which the tubular formation is connected with one end of an actuating lever which is pivoted intermediate its ends on said one brake shoe, the other end of said actuating lever being connected for pivoting with the handbrake lever when the handbrake lever is pivoted to operate the handbrake function so that the tubular formation moves relative to the strut parts so that the cam surface acts on the wedge portion of said one strut part to force the inter-engaging formations into engagement to enable the strut to transmit force between the shoes to apply the brake.

22. A brake according to claim 16 in which the strut parts are pivoted away from each other to disengage the inter-engaging formations by the bias means and are pivoted towards each other to engage the inter-engaging formations when the handbrake lever is operated to apply the brake.

23. A brake according to claim 22 in which the two strut parts are pivoted away from each other by spring means which maintain an abutment surface on one strut part in contact with a co-operating abutment surface on one brake shoe when the handbrake lever is released, the abutment surfaces being shaped and positioned so that said spring means generates a turning movement to pivot said one strut part relative to the other strut part when the abutment surfaces are drawn towards each other by the spring means.

24. A brake according to claim 16 in which each respective strut part is connected with its respective brake shoe by a tension spring which pulls the strut part towards its respective brake shoe.

25. A brake according to claim 16 in which the wedge means connected with said one end of the wedge actuating lever or said one brake shoe by spring means which are tensioned when the handbrake lever is pivoted to apply the brake.

* * * * *